United States Patent
Vollmer

(10) Patent No.: US 6,432,885 B1
(45) Date of Patent: Aug. 13, 2002

(54) WELL TREATMENT FLUIDS AND METHODS FOR THE USE THEREOF

(75) Inventor: Daniel Patrick Vollmer, Lafayette, LA (US)

(73) Assignee: Osca, Inc., Lafayette, LA (US)

( * ) Notice: Subject to any disclaimer, the term of this patent is extended or adjusted under 35 U.S.C. 154(b) by 0 days.

(21) Appl. No.: 09/383,323

(22) Filed: Aug. 26, 1999

(51) Int. Cl.$^7$ .................................. C09K 3/00
(52) U.S. Cl. .................. 507/236; 507/922; 507/203; 507/240; 507/261; 507/265; 507/266; 166/308; 516/56; 516/24
(58) Field of Search .................. 507/128, 236, 507/922, 129, 103, 203, 240, 266, 265, 261; 166/308; 516/56, 24

(56) References Cited

U.S. PATENT DOCUMENTS

| | | | | |
|---|---|---|---|---|
| 2,793,189 A | * | 5/1957 | Schuessler | 507/128 |
| 2,943,051 A | * | 6/1960 | Lummus | 507/236 |
| 3,006,845 A | * | 10/1961 | Van Dyke | 507/236 |
| 3,057,797 A | * | 10/1962 | Anderson | 507/128 |
| 3,761,410 A | | 9/1973 | Mondshine et al. | |
| 3,960,736 A | | 6/1976 | Free et al. | |
| 4,259,191 A | * | 3/1981 | Wagner | 507/240 |
| 4,323,124 A | | 4/1982 | Swan | 166/303 |
| 4,502,540 A | | 3/1985 | Byham | 166/274 |
| 4,517,100 A | | 5/1985 | Nance et al. | |
| 4,614,236 A | * | 9/1986 | Watkins | 507/240 |
| 4,704,229 A | * | 11/1987 | Brunel | 507/240 |
| 4,796,702 A | | 1/1989 | Scherubel | 166/308 |
| 5,057,234 A | * | 10/1991 | Bland et al. | 507/236 |
| 5,141,920 A | * | 8/1992 | Bland et al. | 507/136 |
| 5,238,067 A | | 8/1993 | Jennings, Jr. | |
| 5,318,956 A | * | 6/1994 | Mueller | 507/139 |
| 5,360,558 A | * | 11/1994 | Pakulski | 507/244 |
| 5,432,152 A | | 7/1995 | Dawson et al. | |
| 5,529,122 A | | 6/1996 | Thach | |
| 5,551,516 A | | 9/1996 | Norman et al. | 166/308 |
| 5,593,954 A | | 1/1997 | Malchow, Jr. | |
| 5,707,940 A | | 1/1998 | Bush et al. | |
| 5,710,109 A | | 1/1998 | Surles | |
| 5,807,810 A | | 9/1998 | Blezard et al. | 507/103 |
| 5,964,295 A | | 10/1999 | Brown et al. | 166/308 |
| 5,979,557 A | | 11/1999 | Card et al. | |
| 6,035,936 A | | 3/2000 | Whalen | 166/308 |
| 6,194,354 B1 | | 2/2001 | Hatchman | 507/134 |

FOREIGN PATENT DOCUMENTS

| | | |
|---|---|---|
| GB | 2 001 377 A | 1/1979 |
| WO | WO 98/56497 | 12/1998 |
| WO | WO 99/24693 | 5/1999 |

OTHER PUBLICATIONS

Kirk–Othmer Encyclopedia of Chemical Technology, 4$^{th}$ ed. vol. 15, pp. 192–210, John Wiley & Sons, 1995.
Norwegian Search Report; Norwegian Patent Application No. 2001 1900 (citing U.S. Patent No. 4,323,124), Feb. 11, 2002.
Kullenberg, "Lecithin in Animal Health and Nutrition," Lecithins: Sources, Manufacture & Uses, The American Oil Chemists Society, Champaign, Illinois, pp. 237–252 (1989).
Bellare, et al., "Controlled Environmental Vitrification System: An Improved Sample Preparation Technique," *Journal of Electron Microscopy Technique* 10:87–111 (1988).
Zubay, G., *Biochemistry*, 3d ed., pp. 174–175 (1993).
Alberts et al., "Membrane Structure," *Molecular Biology of the Cell*, 3d ed., pp. 478–484 (1994).
*The Journal of Physical Chemistry*, vol. 98, No. 23, p. 5987 (1994).

* cited by examiner

Primary Examiner—Philip Tucker
(74) Attorney, Agent, or Firm—Baker Botts L.L.P.

(57) ABSTRACT

This invention relates to a well treatment fluid and a method to treat an/or fracture a subterranean formation comprising:
  injecting a well treatment fluid into the formation at sufficient pressure to fracture the formation wherein the fluid comprises:
  (a) one or more amphoteric surfactants;
  (b) water; and
  (c) one or more nonaqueous solvents;
  (d) optionally, an acid forming compound, and
  (e) provided that if the acid forming compound is present a hydrophilic alcohol may also be optionally present.

57 Claims, No Drawings

WELL TREATMENT FLUIDS AND METHODS FOR THE USE THEREOF

FIELD OF THE INVENTION

This invention relates to well treatment fluids comprising amphoteric surfactants and methods of using those fluids to treat and/or fracture subterranean formations.

BACKGROUND OF THE INVENTION

Hydraulic fracturing is used by the petroleum industry to increase well productivity or injectivity by creating highly conductive paths some distance from the well bore in a formation. The fracturing is created by injecting suitable fluids into the well under pressure until the reservoir rock fractures.

Water soluble polymers have been extensively used in the petroleum industry to enhance the productivity of oil and gas operations. These polymers have been used in drilling fluids, gravel pack fluids, fluid loss circulation, and hydraulic fracturing. These i. techniques have one priority in common and that is the ability of the water soluble polymer to suspend solids. Common water soluble polymers used are hydroxy ethyl cellulose (HEC), xanthan gum, crosslinked guar and its derivatives. HEC is typically used for low temperature applications due to its high decrease in viscosity with increase in temperature. Xanthan gum has superior suspension properties over HEC especially at higher temperatures, but because of its higher molecular weight, xanthan gum tends to filter out at the formation face at low permeabilities (less than 50 md ($5\times10^{-8}$ m$^2$)). This is adequate for drill-in fluids since acid and/or oxidizers are subsequently used to remove most of the polymer damage. Xanthan gum is not typically used for hydraulic fracturing because of the difficulty in placing the acid over the proppant if filtered out. If the permeability is high enough for the xanthan gum to flow through the formation, the polymer has a tendency to impart formation damage. Therefore, crosslinked guar and its derivatives have been developed that minimize formation invasion by incorporating a filter cake. Breakers are typically added to the fluid so that they react within the filter cake to allow ease of the oil and gas during flowback. However, the filter cake is typically broken in fragments and is entrained by the proppant, thereby reducing well conductivity.

U.S. Pat. No. 3,960,736 discloses an acid type breaker for lowering the viscosities of polysaccharide solutions using organic esters. In the examples, the pH needs to be lowered to about 3 using an ester to reduce viscosity by 50% within 4 hours from the solution without an ester. If the pH is about 5 to 6, then a longer time of about 24–72 hours are required. In acid soluble formations containing limestone this breaking time cannot be predicted since acid hydrolyzed ester can react with the limestone instead of the polysaccharide.

U.S. Pat. No. 5,551,516 discloses cationic surfactants based upon quaternary ammonium halide salts. The compositions appear to have stable fluid viscosities of about 225° F. (107° C.) and are disclosed to be useful in fracturing. However they fail to address the problems that can occur, like formation damage and ease of flowback by reducing the viscosity after fracture is completed.

WO 99/24693 discloses viscoelastic surfactant fracturing fluids comprising an aqueous medium, an inorganic water soluble salt, a surfactant (anionic, non-ionic or hydrotropic), and optional organic alcohols. Although not mentioned in the disclosures, WO 99/24693's examples produce acidic solutions having a pH less than 2.0. Flowing these types of fluids through Berea sandstone cores produces extreme formation damage (more than 90% damage). The acidic viscous solution reacts with acid soluble materials within the core. Once dissolved the acid insoluble materials are released. Then the viscous solution carries these materials within the core and plugs the pore throats. These problems render WO 99/24693's compositions commercially non-viable.

The inventor herein has discovered that WO 99/24693's acidic solutions can be made neutral or basic without substantially affecting its viscosity. Although this imparts less formation damage, removing the viscous solution is difficult and requires days or weeks of flushing to obtain 20% damage. Further the inventor herein has discovered that providing a breaker to substantially lower the viscosity of the fluid once the fracturing is completed can prevent the proppant from flowing back to surface once the well is put on production. This prevents damage to equipment, lines, and values due to the abrasiveness of the proppant.

The present invention provides fluid stable compositions having stable viscosities above 300° F. (149° C.) that are also pH sensitive so that the fluids may be easily treated to reduce the viscosity and obtain easier flowback and less formation damage.

SUMMARY OF THE INVENTION

This invention relates to well treatment fluids comprising amphoteric surfactant(s), water, non-aqueous solvent(s) and optionally an acid forming compound (provided that if the acid forming compound is present a hydrophilic alcohol may also be optionally present.) and methods of using those fluids to treat or fracture subterranean formations.

DETAILED DESCRIPTION OF THE INVENTION

This invention relates to well treatment fluids comprising:

(a) one or more amphoteric surfactants, preferably present at about 1 to about 50 weight percent, more preferably 1 to 40 weight percent, more preferably about 2 to about 30 weight percent, even more preferably at about 5 to about 25 weight percent based upon the weight of the fluid;

(b) water, preferably present at about 30 to about 95 weight percent, more preferably about 40 to about 90 weight percent, even more preferably at about 50 to about 85 weight percent, based upon the weight of the fluid;

(c) non-aqueous solvent(s), preferably present at about 0.1 to about 25 weight percent, more preferably about 0.5 to about 20 weight percent, even more preferably at about 1 to about 15 weight percent, based upon the weight of the fluid; and (d) optionally, an acid forming compound preferably present at about 0.005 to about 10 weight percent, more preferably about 0.01 to about 5 weight percent, even more preferably at about 0.05 to about 2 weight percent, based upon the weight of the fluid, provided that when the acid forming compound is present a hydrophilic alcohol (i.e. preferably an alcohol that retards the hydrolysis reaction of the acid forming compound) may also be present at about 0.1 to about 15 weight percent, more preferably about 0.5 to about 12 weight percent, even more preferably at about 1 to about 8 weight percent, based upon the weight of the fluid.

In a preferred embodiment the amphoteric surfactant is present at about 8 weight percent to about 10 weight percent and the solvent is present at about 5 weight percent to about 7 weight percent.

In a preferred embodiment the water may be freshwater or salt water. In another embodiment the water may be seawater or water that has had a salt added to it. Such salts include potassium chloride, sodium chloride, cesium chloride, ammonium chloride, calcium chloride, magnesium chloride, sodium bromide, potassium bromide, cesium bromide, calcium bromide, zinc bromide, sodium formate, potassium formate, cesium formate, sodium acetate and mixtures thereof. In one embodiment the salt is present at up to 4 weight % and the salt water is used to treat the formation prior to introducing the fluid into the formation.

In another embodiment the pH of the fluid is, or is adjusted to, about 6.5 or more, more preferably 7 or more, more preferably 8 or more, more preferably 9 or more, more preferably between 9 and 15, more preferably between 7.5 and 9.5. The pH may be adjusted by any means known in the art, including adding acid or base to the fluid, bubbling $CO_2$ through the fluid and the like.

In another embodiment the fluid further comprises a hydrophobic organic alcohol, preferably a $C_4$ to $C_{20}$ hydrophobic alcohol, preferably $C_4$ to $C_{20}$ linear alcohols, preferably an alcohol selected from the group consisting of diethanol, propanol, butanol, pentanol, heptanol, nonanol, decanol, dodecanol, phenol, propanol alcohol ethers, butanol alcohol ethers, ethylbenzyl alcohol, 2-ethyl-1-hexanol, 1-octanol, 2-octanol, and mixtures thereof.

In a preferred embodiment the hydrophilic alcohol is one that is soluble or is miscible with the acid forming compound. Examples of preferred hydrophilic alcohols include methanol, ethanol, propanol, butanol, ethylene glycol, propylene glycol, poly ethylene glycol, poly propylene glycol, dihydric alcohol, poly hydydric alcohol and sugar alcohols and mixtures thereof.

In a preferred embodiment the amphoteric surfactant is lecithin obtained from soybeans and is composed mostly of phosphatidylcholine, phosphatidylethanolamine, and phosphatidylinositol. In another preferred embodiment the amphoteric surfactant is chemically or enzymatically modified. The lecithin may be natural or synthetic lecithin. For more information on lecithin and its many variants, please see the Kirk-Othmer Encyclopedia of Chemical Technology, $4^{th}$ ed. Volume 15, pages 192–210, John Wiley & Sons, 1995. Lecithins Sources, Manufacture & Uses, by Bernared F. Szuhaj, American Oil Chemist' Society, 1985 and Lecithins, by Bernard F. Szuhaj and Gary R. List, American Oil Chemists' Society, 1985.

In another embodiment the non-aqueous solvent comprises one or more hydrocarbons and/or halogenated hydrocarbons, preferably aliphatic or aromatic hydrocarbons, more preferably an alcohol, a mineral oil, soybean oil, corn oil, a fatty acid, a glycol ether, an ether or a mixture thereof. In a particularly preferred embodiment the solvent is a linear, branched or cyclic $C_1$ to $C_{100}$ alcohol, preferably a linear or branched $C_4$ to $C_{20}$ alcohol. Specific examples of preferred solvents include 2-ethyl hexanol, ethylene glycol monobutyl ether, or mixtures thereof.

In another embodiment the fluid optionally comprises an acid forming compound. In a preferred embodiment the acid forming compound comprises an organic or inorganic acid, preferably an organic acid, even more preferably an ester, an anhydride, an acid halide, a polyglycolic acid or a mixture thereof. In a preferred embodiment the acid forming compound comprises methyl formate, ethyl formate, propyl formate, butyl formate, methyl acetate, ethyl acetate, propyl acetate, butyl acetate, ethylene glycol monobutyl acetate, acetic anhydride, acetic formic anhydride, succinic anhydride, tetrachlorophthalic anhydride, chloro ethyl formate, chloro ethyl acetate, chloro, polyglycolic acid and the like and mixtures thereof.

In a preferred embodiment the acid forming compound is present and is methyl formate, ethyl formate, propyl formate and butyl formate and the hydrophilic alcohol if present is methanol, ethanol, propanol or butanol.

In another embodiment the fluid further contains conventional constituents such as corrosion inhibitors, fluid loss additives, gases such as carbon dioxide or nitrogen and the like.

In another embodiment the fluid has a viscosity at 100 $sec^{-1}$ of 100 centipoise or more at 100° F. (37.8° C.). In another embodiment the fluid has a viscosity at 100 $sec^{-1}$ of 300 centipoise or more at 100° F. (37.8° C.). In another embodiment the fluid has a viscosity at 100 $sec^{-1}$ of 310 centipoise or more at 100° F. (37.8° C.). In another embodiment the fluid has a viscosity at 100 $sec^{-1}$ of 350 centipoise or more at 200° F. (93.3° C.). In another embodiment the fluid has a viscosity at 100 $sec^{-1}$ of 250 centipoise or more at 150° F. (65.6° C.). In another embodiment the fluid has a viscosity at 100 $sec^{-1}$ of 300 centipoise or more at 150° F. (65.6° C.). In another embodiment the fluid has a viscosity at 100 $sec^{-1}$ of 100 centipoise or more at 180° F. (82.2° C.). In another embodiment the fluid has a viscosity at 100 $sec^{-1}$ of 250 centipoise or more at 180° F. (82.2° C.). In another embodiment the fluid has a viscosity at 100 $sec^{-1}$ of 110 centipoise or more at 280° F. (137.8° C.).

In another embodiment the fluid has a viscosity at 100 $sec^{-1}$ of 100 centipoise or more at 150° F. (65.6° C.), preferably a viscosity at 100 $sec^{-1}$ of 100 centipoise or more at 175° F. (79.4° C.), even more preferably a viscosity at 100 $sec^{-1}$ of 100 centipoise or more at 200 ° F. (93.3° C.), preferably a viscosity at 100 $sec^{-1}$ of 100 centipoise or more at 225° F. (107.2° C.), even more preferably a viscosity at 100 $sec^{-1}$ of 100 centipoise or more at 240° F. (115.6° C.), preferably a viscosity at 100 $sec^{-1}$ of 100 centipoise or more at 250° F. (121.1° C.), even more preferably a viscosity at 100 $sec^{-1}$ of 100 centipoise or more at 275° F. (135° C.), preferably a viscosity at 100 $sec^{-1}$ of 100 centipoise or more at 300° F. (148.9° C.). In a preferred embodiment the fluid has a viscosity at 100 $sec^{-1}$ of 100 centipoise or more at 320° F. (160° C.) and a pH of about 9.

Viscosity is measured by a Fann 50 rheometer using a B5 bob. About 30 ml of fluid is placed in the cup and is pressurized to 500 psig (3.5 MPa) with nitrogen to prevent boiling of the fluid when heated. These instruments may be obtained from Fann Instrument Company, Houston, Tex.

In a preferred embodiment the fluid contains one or more proppant materials. Preferred proppant materials include gravel, sand, resin coated sand, ceramic beads, bauxite, glass, glass beads and the like that have sufficient compressive strength to hold open the fracture once the pressure is released, or mixtures thereof.

The proppants are typically present at amounts of about 1 to 20 pounds of proppant per gallon added (ppa), preferably about 4 to 18 ppa, more preferably 6 to 16 ppa. In another embodiment, the proppant has a mesh size of up to 60 mesh, preferably between 40 to 60 mesh. In another embodiment 10 to 40 mesh is preferred.

The components of the fluid are preferably combined by mixing the surfactants and solvent or solvents and then adding the mixture to water or brine. Then pH is adjusted to the desired level In general the fluids may be prepared in any suitable manner. For example the surfactants may be blended into the water or the solvent to the desired viscosity then the other components are added. The components may be combined in any order of addition. Standard mixing techniques maybe used with or without heat and or agitation.

In a particularly preferred embodiment the well treatment fluid comprises:

(a) lecithin;
(b) water; and
(c) an alcohol and/or a glycol ether,
(d) an acid forming compound, and
(h) a hydrophilic alcohol,
and wherein the composition has a viscosity at 100 sec$^{-1}$ of 100 centipoise or more at 150° C. and a pH of 6.5 or above.

In a particularly preferred embodiment the fluid comprises lecithin, water, and 2-ethyl-1-hexanol. In a preferred embodiment this composition has a pH of 6.5 or more, preferably between 7 and 12, preferably between 7.5 and 9.5. In another embodiment the water is salt water comprising potassium chloride, sodium chloride, ammonium chloride, calcium chloride, magnesium chloride, or a mixture thereof.

In one embodiment the well treatment fluid of this invention is used to treat and or fracture subterranean formations, particularly petroliferous formations by injecting the fluids described herein into the formation at sufficient pressure to fracture the formation. Sufficient pressures are any pressure above the bottom hole pressure of the well plus friction pressure. Typically the fluid is pumped into a formation at a pressure that will overcome the native overburden pressure of the formation causing fracture.

In another embodiment, the formation has been stabilized with an inorganic water soluble salt capable of inhibiting hydration prior to the fluids described herein being introduced into the formation.

In alternate embodiments the well treatment fluid of this invention can also be used for hydraulic fracturing, drilling, drill-in, completion, work-over, packer, well treating, testing, spacer, polymer flooding, loss circulation, gravel pack, coil tubing, hole abandonment fluid, or viscous gel plugs used to clean out debris in pipelines.

EXAMPLES

Viscosity was measured according to American Petroleum Institute recommended procedure 13D as published in the third edition on Jun. 1, 1995, using a Fann 50 rheometer. A detail testing procedure is provide by Fann Instrument Company, Model 50SL Rheometer Instruction Manual, copyright 1996. A B5 bob and 30 ml of test fluid was used for all tests.

All percents are weight %, unless otherwise noted.

EXAMPLE 1

A viscous solution was prepared by adding 3 ml of 2-ethylhexanol to 74.5 ml of 3% by weight of a sodium chloride solution. Then 17.5 grams of dry amphoteric lecithin was mixed uniformly into the solution and the pH was adjusted to 12 by the addition of 5 ml of 30% by weight sodium hydroxide solution. A Fann 50 was used to measure the viscosity at 100 sec$^{-1}$ at increasing temperatures. The resulting solution has viscosities of 300 centipoise at 125° F. (52° C.) and 100 centipoise at 320° F. (160° C.).

EXAMPLE 2

A viscous solution was prepared by adding 10 ml of ethylene glycol monobutyl ether to 63 ml of a 3 % by weight solution of a potassium chloride solution. Then 25 grams of a 63% by weight solution of amphoteric lecithin was mixed into the solution and 2 ml of a 30% by weight sodium hydroxide solution was added to increase the pH to 12. A Fann 50 was used to measure the viscosity at 100 sec$^{-1}$ at increasing temperatures. The solution maintained a viscosity above 100 centipoise up to 230° F. (110° C.).

EXAMPLE 3

An identical solution was prepared as described in example 2 except that the pH of the solution was reduced to 7 by bubbling carbon dioxide through the solution. A Fann 50 was used to measure the viscosity at 100 sec$^{-1}$ at increasing temperature. The solution had a viscosity above 350 centipoise up to 120° F. (49° C.) and had a viscosity below 20 centipoise at 140° F. (60° C.).

All documents described herein are incorporated by reference herein, including any priority documents and/or testing procedures. As is apparent form the foregoing general description and the specific embodiments, while forms of the invention have been illustrated and described, various modifications can be made without departing from the spirit and scope of the invention. Accordingly it is not intended that the invention be limited thereby.

What is claimed is:

1. A well treatment fluid comprising:
   (a) one or more amphoteric surfactants present at 5 weight percent to about 25 weight percent, based upon the weight of the fluid, wherein at least one of said amphoteric surfactants is a natural lecithin, a synthetic lecithin or a modified lecithin;
   (b) water; and
   (c) one or more nonaqueous solvents present at about 1 weight percent to about 15 weight percent based on the weight of the fluid.

2. The fluid of claim 1 wherein the water is fresh water or salt water.

3. A well treatment fluid comprising:
   (a) one or more amphoteric surfactants present at 5 weight percent to about 25 weight percent, based upon the weight of the fluid;
   (b) seawater; and
   (c) one or more nonaqueous solvents present at about 1 weight percent to about 15 weight percent based on the weight of the fluid.

4. The fluid of claim 1 wherein the one or more amphoteric surfactants are present at about 8 to about 1 0 weight percent, based upon the weight of the fluid.

5. The fluid of claim 1 wherein the one or more amphoteric surfactants are present at about 8 to about 15 weight percent, based upon the weight of the fluid.

6. The fluid of claim 1 wherein the one or more nonaqueous solvents are present at about 5 to about 15 weight percent, based upon the weight of the fluid.

7. The fluid of claim 1 wherein the one or more nonaqueous solvents are present at about 5 to about 7 weight percent, based upon the weight of the fluid.

8. The fluid of claim 1 wherein the one or more nonaqueous solvents are present at about 5 weight percent to about 7 weight percent and the one or more amphoteric surfactants are present at about 8 weight percent to about 10 weight percent, based upon the weight of the fluid.

9. The fluid of claim 1 wherein the pH of the fluid is about 6.5 or more.

10. The fluid of claim 1 wherein the pH of the fluid is about 7 or more.

11. The fluid of claim 1 wherein the pH of the fluid is between about 7.5 and about 9.5.

12. The fluid of claim 1 wherein the water comprises potassium chloride, sodium chloride, cesium chloride, ammonium chloride, calcium chloride, magnesium chloride, sodium bromide, potassium bromide, cesium bromide, calcium bromide, zinc bromide, sodium formate, potassium formate, cesium formate, sodium acetate or mixtures thereof.

13. The fluid of claim 1 wherein the modified lecithin is enzymatically or chemically modified.

14. The fluid of claim 1 wherein the one or more nonaqueous solvents comprise one or more hydrocarbons or halogenated hydrocarbons.

15. The fluid of claim 1 wherein the one or more nonaqueous solvents comprise one or more aliphatic or aromatic hydrocarbons.

16. The fluid of claim 1 wherein the one or more nonaqueous solvents comprise an alcohol, a mineral oil, a fatty acid, soybean oil, corn oil, a glycol ether, an ether or mixture thereof.

17. The fluid of claim 1 wherein the one or more nonaqueous solvents comprise a linear, branched or cyclic $C_1$ to $C_{100}$ alcohol.

18. The fluid of claim 1 wherein the one or more nonaqueous solvents comprise a linear or branched $C_4$ to $C_{20}$ alcohol.

19. The fluid of claim 1 wherein the one or more nonaqueous solvents comprise 2-ethyl hexanol, ethylene glycol monobutyl ether, or mixtures thereof.

20. The well treatment fluid of claim 1 further comprising an acid forming compound and, optionally, a hydrophilic alcohol in addition to said one or more nonaqueous solvents.

21. The fluid of claim 20 wherein the one or more nonaqueous solvents comprise an alcohol, a mineral oil, a fatty acid, soybean oil, corn oil, a glycol ether, an ether or mixture thereof and the acid forming compound comprises methyl formate, ethyl formate, propyl formate or butyl formate and the hydrophilic alcohol if present is methanol, ethanol, propanol or butanol.

22. The fluid of claim 1 wherein the fluid has a viscosity at 100 $sec^{-1}$ of 100 centipoise or more at 100° F.

23. The fluid of claim 1 wherein the fluid has a viscosity at 100 $sec^{-1}$ of 300 centipoise or more at 100° F.

24. The fluid of claim 1 wherein the fluid has a viscosity at 100 $sec^{-1}$ of 300 centipoise or more at 125° F.

25. The fluid of claim 1 wherein the fluid has a viscosity at 100 $sec^{-1}$ of 100 centipoise or more at 300° F.

26. The fluid of claim 20 wherein the acid forming compound comprises an organic or inorganic acid.

27. The fluid of claim 20 wherein the hydrophilic alcohol comprises methanol, ethanol, propanol, butanol, ethylene glycol, propylene glycol, poly ethylene glycol, poly propylene glycol, dihydric alcohol, poly hydydric alcohol, sugar alcohols or mixtures thereof.

28. The fluid of claim 20 wherein the acid forming compound is an ester, an anhydride, an acid halide, a polyglycolic acid or a mixture thereof.

29. A method to treat and/or fracture a subterranean formation comprising:
   injecting a well treatment fluid into the formation at sufficient pressure to fracture the formation, wherein the well treatment fluid comprises:
   (a) one or more amphoteric surfactants present at 5 weight percent to about 25 weight percent, based upon the weight of the fluid, wherein the one or more amphoteric surfactants comprise a natural or synthetic lecithin;
   (b) water; and
   (c) one or more nonaqueous solvents present at about 1 weight percent to about 15 weight percent based on the weight of the fluid.

30. A method to treat and/or fracture a subterranean formation comprising:
   injecting a well treatment fluid into the formation at sufficient pressure to fracture the formation, wherein the well treatment fluid comprises:
   (a) one or more amphoteric surfactants present at 5 weight percent to about 25 weight percent, based upon the weight of the fluid;
   (b) water;
   (c) one or more nonaqueous solvents present at about 1 weight percent to about 15 weight percent based on the weight of the fluid;
   (d) an acid forming compound; and
   (e) optionally, a hydrophilic alcohol in addition to said one or more nonaqueous solvents.

31. The method of claim 30 wherein the acid forming compound is methyl formate, ethyl formate, propyl formate or butyl formate and the hydrophilic alcohol if present is methanol, ethanol, propanol or butanol.

32. A method to treat and/or fracture a subterranean formation comprising:
   injecting a well treatment fluid into the formation at sufficient pressure to fracture the formation, wherein the well treatment fluid comprises:
   (a) one or more amphoteric surfactants present at 5 weight percent to about 25 weight percent, based upon the weight of the fluid;
   (b) water; and
   (c) one or more nonaqueous solvents present at about 1 weight percent to about 15 weight percent based on the weight of the fluid, wherein the one or more nonaqueous solvents comprise one or more hydrocarbons or halogenated hydrocarbons.

33. A method to treat and/or fracture a subterranean formation comprising:
   injecting a well treatment fluid into the formation at sufficient pressure to fracture the formation, wherein the well treatment fluid comprises:
   (a) one or more amphoteric surfactants present at 5 weight percent to about 25 weight percent, based upon the weight of the fluid;
   (b) water; and
   (c) one or more nonaqueous solvents present at about 1 weight percent to about 15 weight percent based on the weight of the fluid, wherein the one or more nonaqueous solvents comprise one or more aliphatic or aromatic hydrocarbons.

34. A method to treat and/or fracture a subterranean formation comprising:
   injecting a well treatment fluid into the formation at sufficient pressure to fracture the formation, wherein the well treatment fluid comprises:
   (a) one or more amphoteric surfactants present at 5 weight percent to about 25 weight percent, based upon the weight of the fluid;
   (b) water; and
   (c) one or more nonaqueous solvents present at about 1 weight percent to about 15 weight percent based on the weight of the fluid, wherein the one or more nonaqueous solvents comprise 2-ethyl hexanol, ethylene glycol monobutyl ether or mixtures thereof.

35. The method of claim 30 wherein the one or more amphoteric surfactants comprise lecithin, the one or more nonaqueous solvents comprise an alcohol, a mineral oil, a fatty acid, soybean oil, corn oil, a glycol ether, an ether or mixture thereof and the acid forming compound comprises methyl formate, ethyl formate, propyl formate or butyl formate and the hydrophilic alcohol if present is methanol, ethanol, propanol or butanol.

36. The method of claim 30 wherein the acid forming compound comprises an organic or inorganic acid.

37. The method of claim 30 wherein the hydrophilic alcohol comprises methanol, ethanol, propanol, butanol, ethylene glycol, propylene glycol, poly ethylene glycol, poly propylene glycol, dihydric alcohol, poly hydydric alcohol, sugar alcohols or mixtures thereof.

38. The method of claim 30 wherein the acid forming compound is an ester, an anhydride, an acid halide, a polyglycolic acid or a mixture thereof.

39. A method to treat and/or fracture a subterranean formation comprising:
    injecting a well treatment fluid into the formation at sufficient pressure to fracture the formation, wherein the well treatment fluid comprises:
    (a) one or more amphoteric surfactants present at 5 weight percent to about 25 weight percent, based upon the weight of the fluid;
    (b) water; and
    (c) one or more nonaqueous solvents present at about 1 weight percent to about 15 weight percent based on the weight of the fluid, and
    wherein prior to injecting the fluid into the formation, the formation has been stabilized with an inorganic water soluble salt capable of inhibiting hydration.

40. A well treatment fluid comprising:
    (a) one or more amphoteric surfactants, wherein at least one of said amphoteric surfactants is a natural lecithin, a synthetic lecithin or a modified lecithin;
    (b) water;
    (c) one or more nonaqueous solvents comprising 2-ethyl hexanol, ethylene glycol monobutyl ether, or a mixture thereof;
    (d) optionally, an acid forming compound; and
    (e) provided that if the acid forming compound is present a hydrophilic alcohol may also optionally be present.

41. A well treatment fluid comprising:
    (a) one or more amphoteric surfactants;
    (b) water;
    (c) one or more nonaqueous solvents;
    (d) an acid forming compound, comprising methyl formate, ethyl formate, propyl formate, butyl formate, or a mixture thereof; and
    (e) optionally, a hydrophilic alcohol in addition to said one or more nonaqueous solvents, said hydrophilic alcohol comprising methanol, ethanol, propanol, butanol or a mixture thereof.

42. The fluid of claim 41 wherein the one or more amphoteric surfactants comprise lecithin, and the one or more nonaqueous solvents comprise an alcohol, a mineral oil, a fatty acid, soybean oil, corn oil, a glycol ether, an ether or a mixture thereof.

43. The fluid of claim 42 wherein the one or more nonaqueous solvents comprise 2-ethyl hexanol, ethylene glycol monobutyl ether, or a mixture thereof.

44. A well treatment fluid comprising:
    (a) one or more amphoteric surfactants, wherein at least one of said amphoteric surfactants is a natural lecithin, a synthetic lecithin or a modified lecithin;
    (b) water;
    (c) one or more nonaqueous solvents; and
    (d) a proppant.

45. The fluid of claim 44 wherein the proppant comprises gravel, sand, resin coated sand, ceramic beads, bauxite, glass, glass beads, or a mixture thereof.

46. A method to treat and/or fracture a subterranean formation comprising:
    injecting a well treatment fluid into the formation at sufficient pressure to fracture the formation, wherein the well treatment fluid comprises:
    (a) one or more amphoteric surfactants;
    (b) water;
    (c) one or more nonaqueous solvents comprising 2-ethyl hexanol, ethylene glycol monobutyl ether, or a mixture thereof;
    (d) optionally, an acid forming compound; and
    (e) provided that if the acid forming compound is present a hydrophilic alcohol may also be optionally present.

47. A method to treat and/or fracture a subterranean formation comprising:
    injecting a well treatment fluid into the formation at sufficient pressure to fracture the formation, wherein the well treatment fluid comprises:
    (a) one or more arnphoteric surfactants;
    (b) water;
    (c) one or more nonaqueous solvents;
    (d) an acid forming compound, comprising methyl formate, ethyl formate, propyl formate, butyl formate, or a mixture thereof; and
    (e) optionally, a hydrophilic alcohol in addition to said one or more nonaqueous solvents, said hydrophilic alcohol comprising methanol, ethanol, propanol, butanol or a mixture thereof.

48. The method of claim 47 wherein the one or more amphoteric surfactants comprise lecithin, and the one or more nonaqueous solvents comprise an alcohol, a mineral oil, a fatty acid, soybean oil, corn oil, a glycol ether, an ether or a mixture thereof.

49. The method of claim 48 wherein the one or more nonaqueous solvents comprise 2-ethyl hexanol, ethylene glycol monobutyl ether, or a mixture thereof.

50. A method to treat and/or fracture a subterranean formation comprising:
    injecting a well treatment fluid into the formation at sufficient pressure to fracture the formation, wherein the well treatment fluid comprises:
    (a) one or more amphoteric surfactants, wherein at least one of said amphoteric surfactants is a natural lecithin, a synthetic lecithin or a modified lecithin;
    (b) water;
    (c) one or more nonaqueous solvents; and
    (d) a proppant.

51. The method of claim 50 wherein the proppant comprises gravel, sand, resin coated sand, ceramic beads, bauxite, glass, glass beads, or a mixture thereof.

52. A method to treat and/or fracture a subterranean formation comprising:
    injecting a well treatment fluid into the formation at sufficient pressure to fracture the formation, wherein the well treatment fluid comprises:
    (a) one or more amphoteric surfactants, wherein at least one of said amphoteric surfactants is a natural lecithin, a synthetic lecithin or a modified lecithin;
    (b) water; and (c) one or more nonaqueous solvents, wherein prior to injecting the fluid into the formation, the formation has been stabilized with an inorganic water soluble salt capable of inhibiting hydration.

53. The well treatment fluid of claim 3 further comprising an acid forming compound and, optionally, a hydrophilic alcohol in addition to said one or more nonaqueous solvents.

54. A well treatment fluid comprising:
(a) one or more amphoteric surfactants present at 5 weight percent to about 25 weight percent, based upon the weight of the fluid;
(b) water;
(c) one or more nonaqueous solvents present at about 1 weight percent to about 15 weight percent based on the weight of the fluid;
(d) proppant;
(e) an acid forming compound; and
(f) optionally, a hydrophilic alcohol in addition to said one or more nonaqueous solvents.

55. The well treatment fluid of claim 44 further comprising an acid forming compound and, optionally, a hydrophilic alcohol in addition to said one or more nonaqueous solvents.

56. The method of claim 50 wherein said well treatment fluid further comprises an acid forming compound and, optionally, a hydrophilic alcohol in addition to said one or more nonaqueous solvents.

57. The method of claim 52 wherein said well treatment fluid further comprises an acid forming compound and, optionally, a hydrophilic alcohol in addition to said one or more nonaqueous solvents.

* * * * *